Feb. 17, 1942. W. H. GILLE 2,273,703
PISTON RING
Filed Jan. 22, 1940
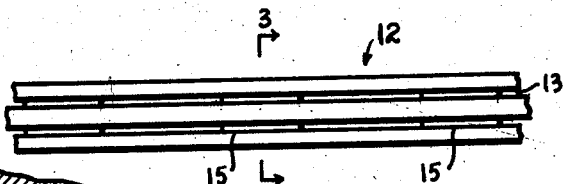
Fig. 1
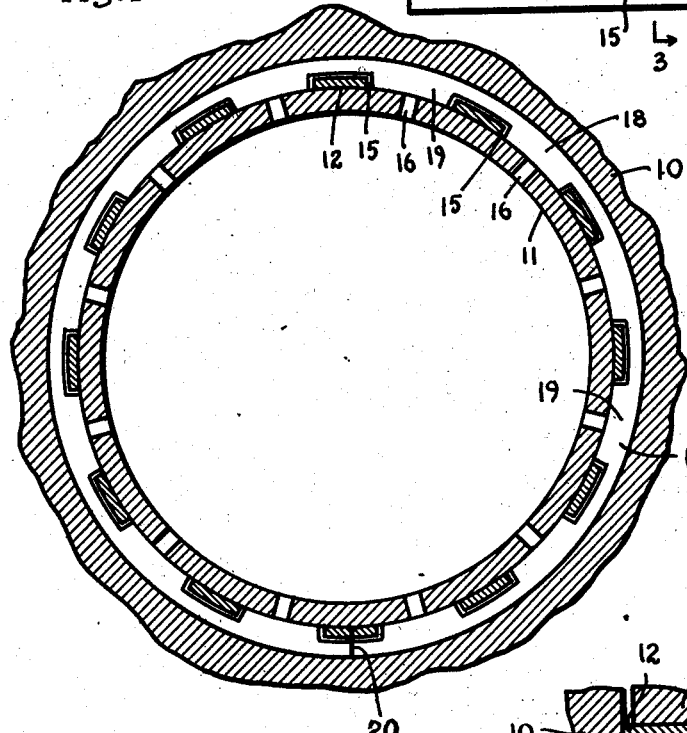
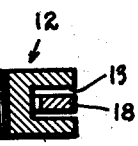
Fig. 3
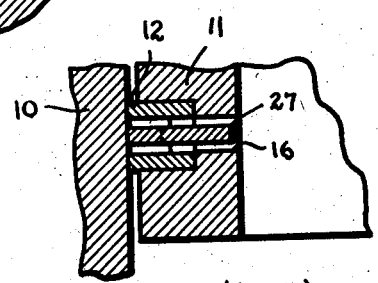
Fig. 5
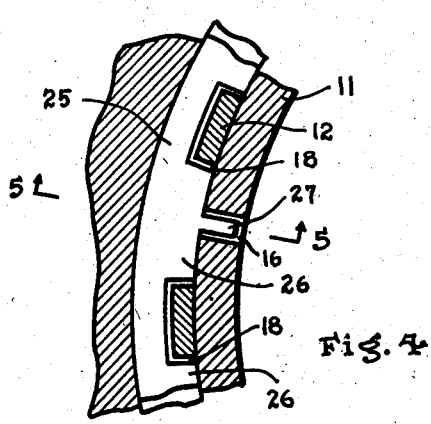
Fig. 4
Willis H. Gille
Inventor
By Frederick E. Lange
Attorney Patented Feb. 17, 1942

2,273,703

UNITED STATES PATENT OFFICE 2,273,703

PISTON RING

Willis H. Gille, St. Paul, Minn., assignor to Power Research Corporation, Boston, Mass., a corporation Application January 22, 1940, Serial No. 314,969

2 Claims. (Cl. 309—45)

The present invention is concerned with an improved piston ring and more particularly with one of the type provided with openings extending therethrough for the retention and return of oil.

It is common practice in the internal combustion art to provide each piston with at least one piston ring having an oil groove. Communicating with this oil groove are openings extending entirely through the ring radially thereof and in communication with openings through the wall of the piston. The oil, in travelling up the cylinder wall, is retained in the oil groove and passes through the openings in the piston ring and the piston back to the crankcase. The operation of this piston ring to retain the oil is obviously dependent upon the openings being maintained relatively free from foreign matter so that the oil can pass therethrough. There is considerable tendency for these oil grooves and openings to become clogged with carbon. An object of the present invention is to provide means for maintaining the openings through a ring of the above type relatively free of foreign matter.

A further object is to provide a piston ring having a plurality of oil openings therethrough which has associated therewith a member having portions extending through the openings, said member being reciprocable in the direction of movement of the ring.

A still further object of the invention is to provide a piston having such a ring and wherein the reciprocable member has portions extending through the openings in the piston so as to clean these openings.

A further object of the invention is to provide such an arrangement in which the outer diameter of the reciprocable member corresponds to the outer diameter of the piston ring so as to engage the cylinder wall and be reciprocated with respect to the piston ring as the piston moves up and down.

Other objects of the invention will be apparent from a consideration of the accompanying specification, claims, and drawing of which:

Figure 1 is a horizontal cross-sectional view of a cylinder, piston, and a piston ring constructed in accordance with my invention, Figure 2 is an elevational view of a portion of the improved piston ring, Figure 3 is a transverse section of a portion of the ring, the section being taken along the line 3—3 of Figure 2, Figure 4 is a horizontal sectional view of a portion of a cylinder wall, a piston, and a modified form of my piston ring, And Figure 5 is a transverse sectional view of the modified form of the ring located on a piston, the section being taken along the line 5—5 of Figure 4.

Referring to the drawing for a more detailed understanding of the invention, the numeral 10 is employed to designate the wall of a piston cylinder of an ordinary internal combustion engine. The wall of the piston is designated by the numeral 11. Located within a groove of this piston is a piston ring generally designated by the numeral 12. As best shown in Figures 2 and 3, this ring is provided with an annular groove 13. Communicating with this groove are spaced openings 15 which extend entirely through the ring. As best shown in Figure 1, these openings communicate with smaller openings 16 extending through the piston wall.

The ring 12 is normally the lowermost piston ring. As the oil is carried up the cylinder wall by the reciprocation of the piston, the oil enters the oil groove 13. It is easier for the oil entering this groove to pass through the openings 15 and 16 into the interior of the piston than it is for this oil to pass between the upper portion of the ring and the cylinder wall. Thus, as long as the openings 15 and 16 are maintained clear, substantially all of the pumped oil is returned through openings 15 and 16 to the crankcase. The difficulty is that the ring 12 is constantly exposed to carbon with the result that an accumulation of carbon tends to build up in the groove 13. This carbon enters the openings 15, completely closing the same. In extreme cases, the carbon may even enter and close the openings 16.

The present invention is principally concerned with means for preventing such clogging. This means takes the form of an annular ring 18 having tongues 19 entering the openings 15 and extending therethrough. The ring 18 and the ring 12 are both split along a common line, indicated by the numeral 20, in order that they may be assembled on the piston. The tongues 19 are of substantially the same size as the openings, as clearly indicated in Figure 1. Furthermore, the thickness of the ring 18 is only a fraction of the width of groove 13 and openings 15 so that the ring 18 is free to reciprocate in the direction of movement of the piston. The outer diameter of ring 18 is substantially the same as that of the piston ring 12, as best indicated in Figure 3, and the ring is formed so as to tend to spring outwardly. The result is that the outer surface of the ring 18 firmly engages the cylinder wall 10 so that the movement of the piston causes movement of member 18 in the direction of movement of the piston. The effect of this is that the tongues 19 are reciprocated in the openings 15 so as to keep these openings relatively free of carbon. In this manner, the openings 15 are maintained in condition to carry out their intended function throughout the normal life of the internal combustion engine. Moreover, the ring 18 acts as an oil scraper ring to further increase the efficiency of the entire piston ring assembly.

In the modification of Figures 4 and 5, means are also provided for cleaning the openings in the piston proper. While these openings exhibit less tendency to become clogged due to the fact that they are less accessible to the carbon, there is a slight tendency for even these openings to become so clogged. Referring to Figure 4, the numeral 25 is employed to designate a ring similar in function to ring 18. This ring is a flat ring similar to ring 18 and cooperates with a piston ring which is identical with ring 12 and for this reason is designated by this reference numeral. It will be noted that ring 25 is provided with projections 26 which extend into openings 18 of ring 12. The ring 25 as so far described is identical with cleaner ring 18. The ring 25 is, unlike ring 18, provided with further projections 27 extending from the projections 26. The projections 27 are considerably smaller in size than projections 26 and are of a size adapted to extend through the openings 16 of piston 11. The dimensions of the projections 27 longitudinally of the piston is relatively small as compared with that of openings 16. The result is that the reciprocation of ring 25 with respect to the piston ring 12 is not impeded in any way by the projections 27. The reciprocation of the ring 25 serves not only to keep the openings 18 in the piston ring 12 clean but also serves to keep clean the openings 16 in the piston 11.

It will be seen that I have provided an extremely simple and highly effective piston ring structure wherein the oil is returned through openings in the ring to the piston, and wherein means are provided for assuring that these openings will remain free of foreign matter.

While I have shown a specific embodiment of my invention for purposes of illustration, it will be understood that the invention is to be limited only by the scope of the appended claims.

I claim as my invention:

1. In combination, a hollow piston having an annular groove in the outer surface thereof, openings extending from the inner wall of said groove to the inner surface of said piston, a piston ring disposed in said groove, said piston ring having a plurality of openings extending therethrough and communicating with the openings through said piston, and a member associated with said ring and having portions extending through both said openings in the piston ring and said openings in the piston, said member being reciprocable with respect to said ring and piston in the direction of normal movement of said piston in operation so as to reciprocate said portions within said openings as said piston is reciprocated.

2. In combination an oil control piston ring and a piston which has oil passages formed therein, said ring comprising spaced-apart sides, connecting portions for the sides, said connecting portions having radially extending oil passages formed therein, annular scavenger means floating loosely between the said sides, tongue means forming a part of the scavenger means and adapted to extend into the radial oil passages of the ring, and relatively smaller tongue means forming a part of the said first tongue means and adapted to extend into the oil passages of said piston.

WILLIS H. GILLE.